Dec. 13, 1938.　　　　　G. A. LYON　　　　　2,139,901

ORNAMENTAL FENDER SKIRT

Filed Oct. 7, 1936　　　2 Sheets-Sheet 1

Inventor
GEORGE ALBERT LYON.
by Charles A. Wills Attys.

Dec. 13, 1938.  G. A. LYON  2,139,901
ORNAMENTAL FENDER SKIRT
Filed Oct. 7, 1936  2 Sheets-Sheet 2
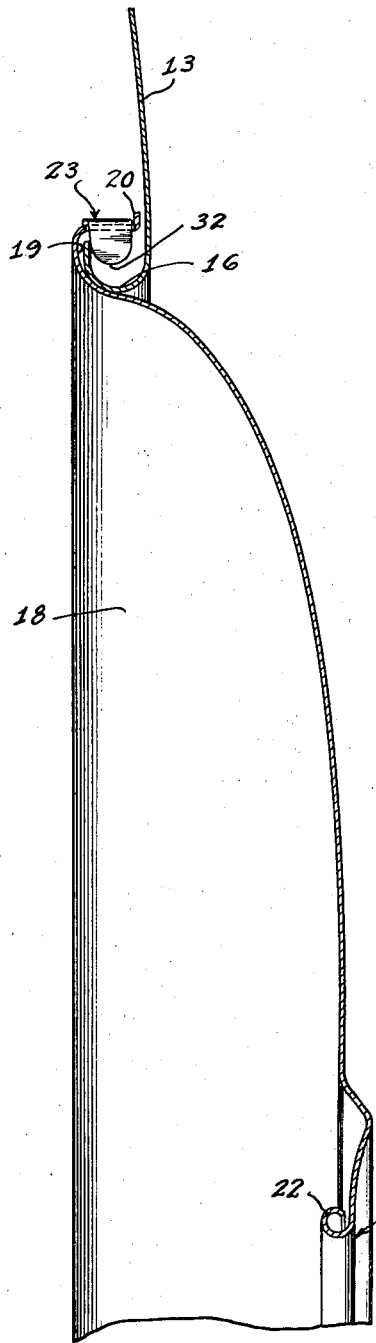
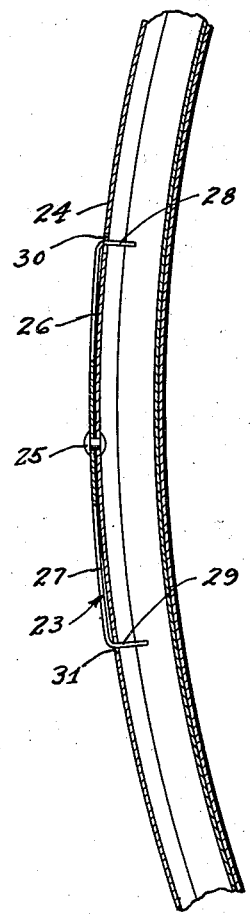
Inventor
GEORGE ALBERT LYON
by Charles H. Hill Attys Patented Dec. 13, 1938

2,139,901

UNITED STATES PATENT OFFICE 2,139,901

ORNAMENTAL FENDER SKIRT

George Albert Lyon, Allenhurst, N. J., assignor to Lyon Incorporated, Detroit, Mich., a corporation of Delaware Application October 7, 1936, Serial No. 104,377

10 Claims. (Cl. 280—153)

This invention relates to ornamental fender skirts, and more particularly to fender skirts of the type having a fender engaging edge which is adapted to extend beneath the underturned opening defining edge of a vehicle fender to engage the under or inner side only of the fender.

In designing ornamental fender skirts or shields of the type which are adapted to cover or partially cover the usual wheel access opening in a vehicle fender, it is important that the means which is employed to secure the fender skirt in desired position be simple and quick to operate both in assembling the fender skirt on the vehicle fender and in removing it therefrom. It must also possess the desired degree of ruggedness when in use and be substantially free from vibration and noise. As the term "fender skirt" shall hereinafter be employed, it designates any member which is adapted to be secured to a fender for the purpose of covering or partially covering that opening therein which is provided for access to and removal of a vehicle wheel.

It is an object of this invention to provide a novel ornamental fender skirt which possesses the above highly desirable characteristics.

It is a further object of this invention to provide an improved fender skirt which is economical to manufacture and which is rugged and reliable in use.

It is a still further object of this invention to provide a novel, ornamental fender skirt having a fender engaging edge which engages only the under or inner side of a vehicle fender.

Another object of this invention is to provide an ornamental fender skirt having novel means thereon for securing the fender skirt in desired position on a vehicle fender.

Another and further object of this invention is to provide a novel, ornamental fender skirt having novel means thereon for increasing the rigidity of the fender skirt.

The novel features which I believe to be characteristic of my invention are set forth with particularity in the appended claims. My invention itself, however, both as to its organization and manner of construction, together with further objects and advantages thereof, may best be understood by reference to the following description taken in connection with the accompanying drawings, in which:

Figure 3 is an enlarged fragmentary view illustrating the novel fender engaging means carried on the ornamental fender skirt of Figure 1; and Figure 4 is an enlarged cross-sectional view of a portion of the fender skirt and the vehicle fender taken longitudinally through the fender engaging means illustrated in Figure 3.

Figure 1:
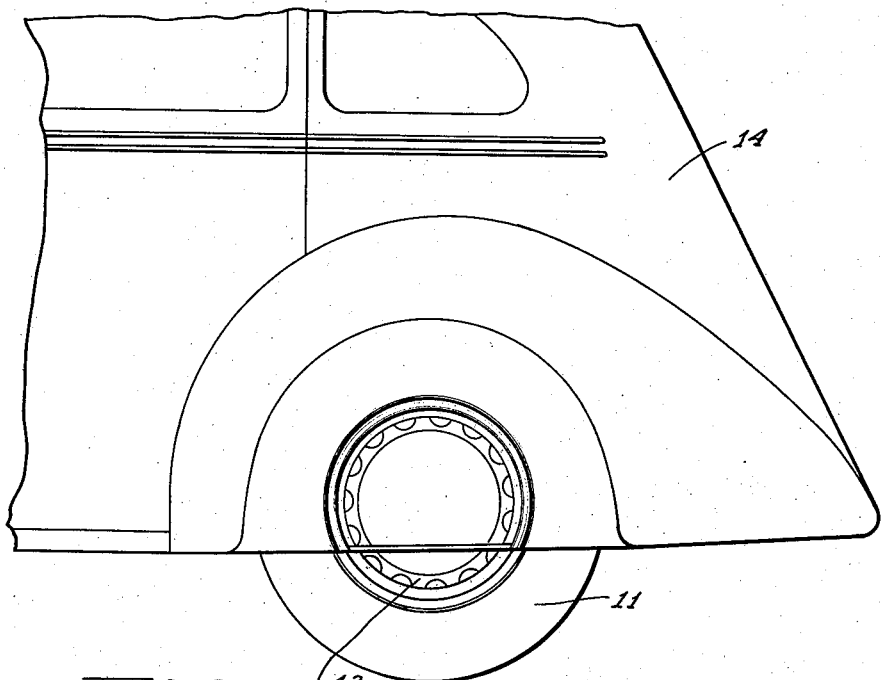
Figure 1 is a side elevational view of the rear part of an automobile having the usual form of vehicle fender and one embodiment of my novel, ornamental fender skirt mounted thereon.
Figure 2:
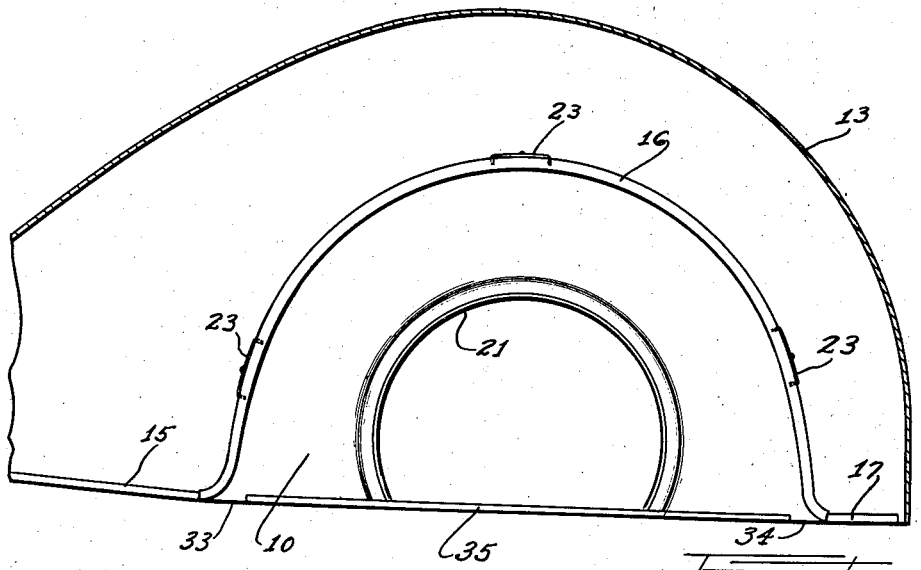
Figure 2 is a side elevational view, partly in cross section, of a vehicle fender and an ornamental fender skirt of the type illustrated in Figure 1, as viewed from the interior of the automobile body looking outwardly.

In the preferred embodiment of this invention shown in the drawings, an ornamental fender skirt 10, of the type which is adapted to conceal a substantial portion of tire 11 of vehicle wheel 12, is illustrated as being mounted on a vehicle fender 13 of an automobile 14. Although fender 11 may assume many different shapes without departing from the spirit and scope of this invention, it is illustrated as being of the usual high crown type having underturned edges 15, 16 and 17. As will hereinafter be explained, advantage is taken of underturned edge 16 to support and secure fender skirt 10 in desired position on vehicle fender 13.

A better understanding of this invention may be had from a close inspection of Figures 3 and 4 of the drawings. The outer fender engaging edge 18 of fender skirt 10 is curled to form an axially outwardly opening channel 19, the outer edge of channel 19 being bent radially outwardly to form a lip 20 thereby to increase the general rigidity of fender skirt 10. Channel 19 is shaped to snugly fit the underturned edge 16 of fender 11. The inner marginal edge 21 of fender skirt 10 may be given any configuration which is pleasing to the eye and which will enhance the general appearance of automobile 14 as a whole. As illustrated, inner marginal edge 21 of fender skirt 10 is curled inwardly as at 22 to form a bead. Bead 22 not only adds to the general appearance but also acts to give greater rigidity to the fender skirt as a whole.

In order to restrain lateral displacement of fender skirt 10 after it is moved into position on fender 13, a plurality of resilient securing members 23 are fastened to the outer wall 24 of channel portion 19 by rivets 25, or in any other suitable manner. Resilient members 23 are preferably formed of spring steel and extend longitudinally outwardly from rivets 25 to form arms 26 and 27. The outer ends of arms 26 and 27 are bent inwardly forming tongues 28 and 29 respectively which extend through complementary apertures 30 and 31 in wall 24 of channel portion 19. As will be understood from the drawings, tongues 28 and 29 are adapted to extend into the channel formed by underturned edge 16, thereby to restrain lateral displacement of fender skirt 10. By rounding the ends of tongues 28 and 29 as at 32, the tongues will be cammed over the rear edge of the channel formed by underturned edge 16 as the fender skirt 10 is moved axially outwardly into engagement with fender 11.

Inasmuch as the lower ends 33 and 34 of fender skirt 10 are apt to vibrate when the automobile 14 is traveling over rough roads, it has sometimes been found desirable to further increase the rigidity of fender skirt 10 by securing a substantially rigid bar 35 across the base of fender skirt 10. Bar 35 may be secured to ends 33 and 34 of fender skirt 10 in any suitable manner such as by welding, brazing, or riveting.

To assemble ornamental fender skirt 10 on fender 13, it is simply necessary to grasp the fender skirt 10 by its inner marginal edge 21 and first raise it upwardly between wheel 12 and the outer wall 13, and then move it axially outwardly causing channel portion 19 to seat itself over underturned edge 16 of fender 13. As channel portion 19 passes over edge 16, tongues 28 and 29 are cammed over the rear edge of the channel formed by the underturned edge 16 into skirt retaining engagement with the latter. The inherent resiliency of members 23 thereafter restrains further lateral displacement of fender skirt 10, and consequently fender skirt 10 is firmly secured to fender 13.

To dismount fender skirt 10 from fender 13, it is simply necessary to give the outer edge of fender skirt 10 a sharp push or shove. This causes tongues 28 and 29 of resilient member 23 to be cammed out of engagement with the channel formed by underturned edge 16 of fender 13. Fender skirt 10 may thereafter be readily removed from its association with the automobile.

From the above description, it will be apparent that I have provided an extraordinarily simple means for securing an ornamental fender skirt to a vehicle fender. Although the ornamental fender skirt has been described as being of the type which only partially covers the wheel access opening of a vehicle fender, it will be obvious to those skilled in the art that the fender skirt may be of the type which substantially or completely covers the wheel access opening of a vehicle fender without departing from the spirit and scope of this invention. Furthermore, although the vehicle fender has been illustrated as being of the high crown type, having underturned marginal edges, it is to be understood that the ornamental fender skirt may be employed with equal success with any type of fender having underturned marginal edges or the like.

While I have shown particular embodiments of my invention, it will of course be understood that I do not wish to be limited thereto, as many modifications may be made and I therefore contemplate by the appended claims to cover all such modifications as fall within the true spirit and scope of my invention.

I claim as my invention:

1. As an article of manufacture, an ornamental fender skirt having a fender engaging edge adapted to engage only the inner side of a vehicle fender, and means on said skirt adapted to extend into detachable snap-on skirt securing engagement with the underturned marginal edge of a vehicle fender.

2. As an article of manufacture, an ornamental fender skirt having an axially outwardly opening channel portion adapted to engage the underturned marginal edge of a vehicle fender, and snap-on means on said skirt adapted to retain said skirt in desired position on said fender.

3. As an article of manufacture, an ornamental fender skirt having an axially outwardly opening channel portion adapted to engage the underturned marginal edge of a vehicle fender, and means on said skirt adapted to extend into snap-on skirt retaining engagement with said underturned edge of said fender.

4. As an article of manufacture, an ornamental fender skirt having an axially outwardly opening channel portion adapted to engage the underturned marginal edge of a vehicle fender, and at least one resilient member on said skirt adapted to extend into skirt retaining engagement with said underturned edge of said fender.

5. As an article of manufacture, an ornamental fender skirt having an axially outwardly opening channel portion adapted to engage the underturned marginal edge of a vehicle fender, and at least one spring clip of said skirt adapted to extend into skirt retaining engagement with said underturned edge of said fender.

6. As an article of manufacture, an ornamental fender skirt having a marginal edge portion shaped to curl about and overlap the curled underturned opening defining edge of a vehicle fender into skirt supporting engagement therewith, and means on said skirt adapted to restrain lateral displacement of said skirt when said skirt is in assembled position on said fender.

7. As an article of manufacture, an ornamental fender skirt having a marginal edge portion shaped to curl about and overlap the underturned opening defining edge of a vehicle fender into skirt supporting engagement therewith, and at least one resilient member adapted to extend into the channel formed by said underturned opening defining edge to restrain lateral displacement of said skirt when said skirt is in assembled position on said fender.

8. As an article of manufacture, an ornamental fender skirt having a marginal edge portion shaped to curl about and overlap the curled underturned opening defining edge of a vehicle fender into skirt supporting engagement therewith, and means on said skirt adapted to make a detachable snap-on engagement with said underturned opening defining edge thereby to restrain lateral displacement of said skirt.

9. As an article of manufacture, an ornamental fender skirt shaped substantially to conceal only the upper half of a vehicle tire when assembled in the wheel access opening of a vehicle fender, the outer marginal edge of said skirt being shaped to curl about an underturned wheel opening defining edge of said fender, and detachable snap-on means on said skirt adapted to secure said skirt to said fender.

10. As an article of manufacture, an ornamental fender skirt shaped substantially to conceal only the upper portion of a vehicle tire when assembled in the wheel access opening of a vehicle fender, the outer marginal edge of said skirt being shaped to curl about an underturned wheel opening defining edge of said fender, and a plurality of spring elements secured to said skirt adapted to be cammed into detachable engagement with said wheel opening edge of said fender.

GEORGE ALBERT LYON.